United States Patent
Sung

(10) Patent No.: US 11,254,284 B2
(45) Date of Patent: Feb. 22, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Yukyoung Sung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 16/743,901

(22) Filed: Jan. 15, 2020

(65) Prior Publication Data

US 2021/0078529 A1 Mar. 18, 2021

(30) Foreign Application Priority Data

Sep. 17, 2019 (KR) .......................... 10-2019-0114191

(51) Int. Cl.
*B60R 22/48* (2006.01)
*B60N 2/00* (2006.01)

(52) U.S. Cl.
CPC .............. *B60R 22/48* (2013.01); *B60N 2/002* (2013.01); *B60R 2022/4808* (2013.01)

(58) Field of Classification Search
CPC ............ B60R 22/48; B60R 2022/4808; B60R 2022/4816; B60R 2022/4866; B60R 2021/01265; B60N 2/002
See application file for complete search history.

(56) References Cited

U.S. PATENT DOCUMENTS

| 7,813,856 | B2 * | 10/2010 | McCall ................... | B60R 22/48 |
| | | | | 701/45 |
| 2005/0156726 | A1 * | 7/2005 | Rubel ..................... | B60R 22/48 |
| | | | | 340/457.1 |
| 2015/0251618 | A1 * | 9/2015 | Ghannam ............... | B60R 22/48 |
| | | | | 340/457.1 |

(Continued)

FOREIGN PATENT DOCUMENTS

| EP | 1925506 | 5/2008 |
| EP | 2839997 | 2/2015 |

(Continued)

OTHER PUBLICATIONS

European Search Report for European Application No. EP20151686 dated Jul. 27, 2020 (5 pgs).

*Primary Examiner* — James A English
(74) *Attorney, Agent, or Firm* — Slater Matsil, LLP

(57) ABSTRACT

A vehicle includes a door sensor configured to detect opening and closing of a door; a radar provided in the vehicle and configured to acquire radar data regarding an object in the vehicle; a seatbelt sensor configured to detect a state of a seat belt provided on each seat of the vehicle; a seatbelt indicator configured to provide a notification regarding fastening of the seat belt; and a controller configured to control the radar in response to the opening and the closing of the door, perform a first check regarding the state of the seatbelt, check an occupancy and an occupied position of the object based on the radar data, identify a type of the object in the vehicle based on the radar data, and determine an operating state of the seatbelt indicator based on the type of the object and the occupied position of the object.

16 Claims, 5 Drawing Sheets

(56) References Cited

U.S. PATENT DOCUMENTS

| | | | |
|---|---|---|---|
| 2016/0046261 A1* | 2/2016 | Gulash | G05D 1/0055 701/23 |
| 2018/0222346 A1 | 8/2018 | Reckziegel et al. | |
| 2020/0207358 A1* | 7/2020 | Katz | G06K 9/00845 |

FOREIGN PATENT DOCUMENTS

| | | |
|---|---|---|
| WO | WO2018/096053 | 5/2018 |
| WO | WO2019/027433 | 2/2019 |

* cited by examiner

VEHICLE AND METHOD OF CONTROLLING THE SAME

CROSS-REFERENCE TO RELATED APPLICATION

The present application claims priority to and the benefit of Korean Patent Application No. 10-2019-0114191, filed on Sep. 17, 2019, which is incorporated herein by reference in its entirety.

TECHNICAL FIELD

The present disclosure relates to a vehicle capable of appropriately providing a notification regarding seat belt wearing and a method of controlling the same.

BACKGROUND

The statements in this section merely provide background information related to the present disclosure and may not constitute prior art.

Recently, wearing seat belts has been mandatory for the rear seat passengers by the laws strengthening the rear seat safety. Accordingly, technology of rear seat seatbelt reminder has been applied to vehicles. The conventional technology provides a notification regarding a seat belt for more than 60 seconds unconditionally when the vehicle is turned on. Such a conventional technology, which provide the notification regarding the seat belt regardless of whether the passenger rides the vehicle, may bother the driver. In addition, a vehicle provided with a seating sensor may determine that a person has boarded the vehicle when a heavy load is placed on the seat, and provides an undesired inappropriate seat belt notification.

SUMMARY

The present disclosure provides a vehicle capable of identifying the type of an object occupying the vehicle by using a radar provided in the vehicle and determining an operating state of a seat belt indicator according to the type of the object, and a method of controlling the same.

The present disclosure also provides a vehicle capable of preventing an undesired inappropriate notification by turning on/off the operation of the seatbelt indicator according to the type of the object, and capable of ensuring the safety of the passenger by allowing the passengers to wear the seatbelt, and a method of controlling the same.

Additional aspects of the disclosure will be set forth in part in the description which follows and, in part, will be obvious from the description, or may be learned by practice of the disclosure.

Therefore, in one form of the present disclosure, a vehicle including: a door sensor configured to detect opening and closing of a door; a radar provided in the vehicle and configured to acquire radar data regarding an object in the vehicle; a seatbelt sensor configured to detect a state of a seat belt provided on each of seats of the vehicle; a seatbelt indicator configured to provide a notification regarding fastening of the seat belt; and a controller configured to operate the radar in response to the opening and the closing of the door being detected, perform a first check regarding the state of the seatbelt, check an occupancy and an occupied position of the object on the basis of the radar data, identify a type of the object in the vehicle on the basis of the radar data, and determine an operating state of the seatbelt indicator on the basis of the type of the object and the occupied position of the object.

The controller may determine the operating state of the seatbelt indicator to have an off-state if the type of the object is not a human.

The controller may perform a second check regarding the state of the seatbelt if the type of the object is a human, and determine the operating state to have an on-state or an off-state depending on a result of the second check.

The controller may turn on the seatbelt indicator after performing the first check regarding the state of the seat belt, and maintain the operating state of the seatbelt indicator in an on-state or switches the operating state of the seatbelt indicator to an off-state.

The controller may determine the operating state of the seat belt indicator to have an off-state if the state of the seat belt is determined to be in an unfasten state according to the first check and is determined to be in a fastened state according to the second check.

The controller may determine the operating state of the seatbelt indicator to have an on-state if the state of the seat belt is determined to be in an unfasten state according to the first check and is determined to be in an unfastened state according to the second check.

The controller may determine the operating state of the seat belt indicator to have an off-state if the state of the seat belt is determined to be in a fasten state according to the first check and is determined to be switched to an unfastened state and then to a fastened state according to the second check.

The controller may determine the operating state of the seat belt indicator to have an on-state if the state of the seat belt is determined to be in a fasten state according to the first check and is determined to be kept according to the second check.

The seatbelt indicator may include at least one of an indicator light provided in a cluster, a graphic user interface output through an audio, video, navigation (AVN) device, and a warning sound output through a speaker.

In another form of the present disclosure, a method of controlling a vehicle including: detecting opening and closing of a door; acquiring, by a radar provided in the vehicle, radar data regarding an object in the vehicle when the opening and closing of the door is detected; performing a first check regarding a state of a seat belt provided on each of seats of the vehicle; checking an occupancy and an occupied position of the object on the basis of the radar data; identifying a type of the object in the vehicle on the basis of the radar data; and determining an operating state of the seatbelt indicator on the basis of the type of the object and the occupied position of the object.

The determining of the operating state of the seatbelt indicator may include determining the operating state of the seatbelt indicator to have an off-state if the type of the object is not a human.

The determining of the operating state of the seatbelt indicator may include: performing a second check regarding the state of the seatbelt if the type of the object is a human; and determining the operating state to have an on-state or an off-state depending on a result of the second check.

The method may further include turning on the seatbelt indicator after performing the first check regarding the state of the seat belt, wherein the determining of the operating state of the seatbelt indicator may include maintaining the operating state of the seatbelt indicator in an on-state or switching the operating state of the seatbelt indicator to an off-state.

The determining of the operating state of the seatbelt indicator may include determining the operating state of the seat belt indicator to have an off-state if the state of the seat belt is determined to be in an unfasten state according to the first check and is determined to be in a fastened state according to the second check.

The determining of the operating state of the seatbelt indicator may include determining the operating state of the seatbelt indicator to have an on-state if the state of the seat belt is determined to be in an unfasten state according to the first check and is determined to be in an unfastened state according to the second check.

The determining of the operating state of the seatbelt indicator may include determining the operating state of the seat belt indicator to have an off-state if the state of the seat belt is determined to be in a fasten state according to the first check and is determined to be switched to an unfastened state and then to a fastened state according to the second check.

The determining of the operating state of the seatbelt indicator may include determining the operating state of the seat belt indicator to have an on-state if the state of the seat belt is determined to be in a fasten state according to the first check and is determined to be kept according to the second check.

The seatbelt indicator may include at least one of an indicator light provided in a cluster, a graphic user interface output through an audio, video, navigation (AVN) device, and a warning sound output through a speaker.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
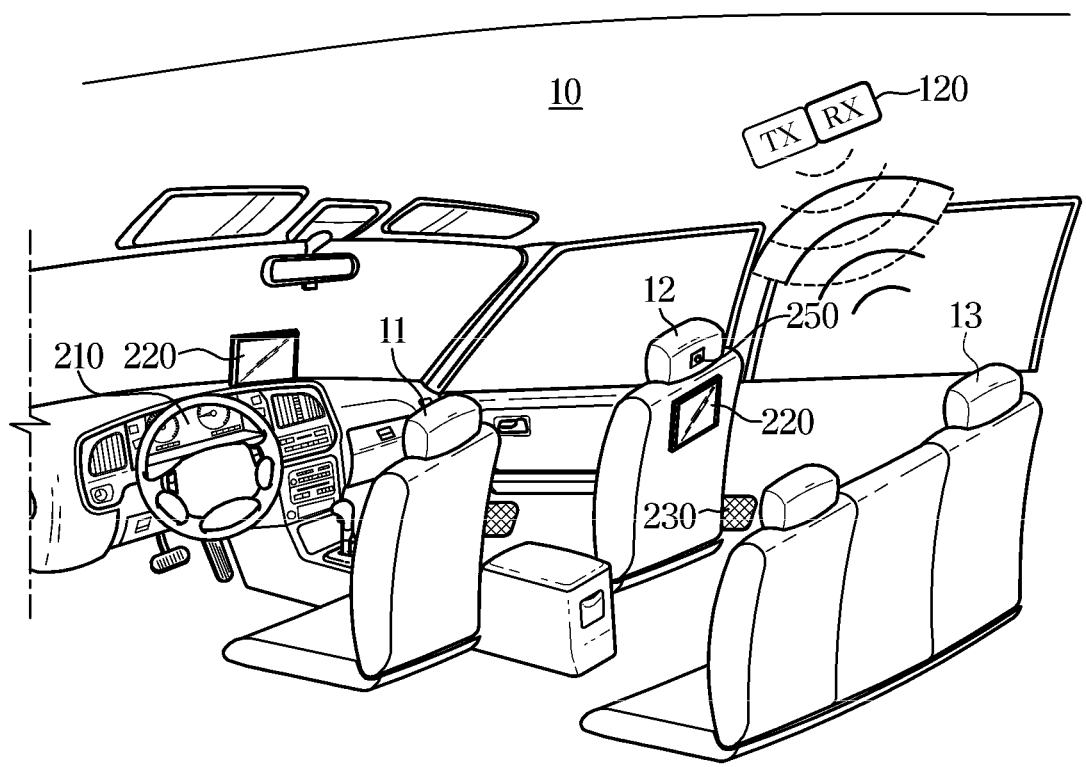
FIG. 1 is a view illustrating an interior of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of forms of the present disclosure will be described, and description of what are commonly known in the art or what overlap each other in the forms will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise. It is to be understood that the singular forms "a," "an," and "the" include plural references unless the context clearly dictates otherwise.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Although the terms "first," "second," "A," "B," etc. may be used to describe various components, the terms do not limit the corresponding components, but are used only for the purpose of distinguishing one component from another component. Reference numerals used for method steps are just used for convenience of explanation, but not to limit an order of the steps. Thus, unless the context clearly dictates otherwise, the written order may be practiced otherwise.

Hereinafter, a vehicle and a method of controlling the same in some forms of the present disclosure will be described with reference to the accompanying drawings.

Figure 2:
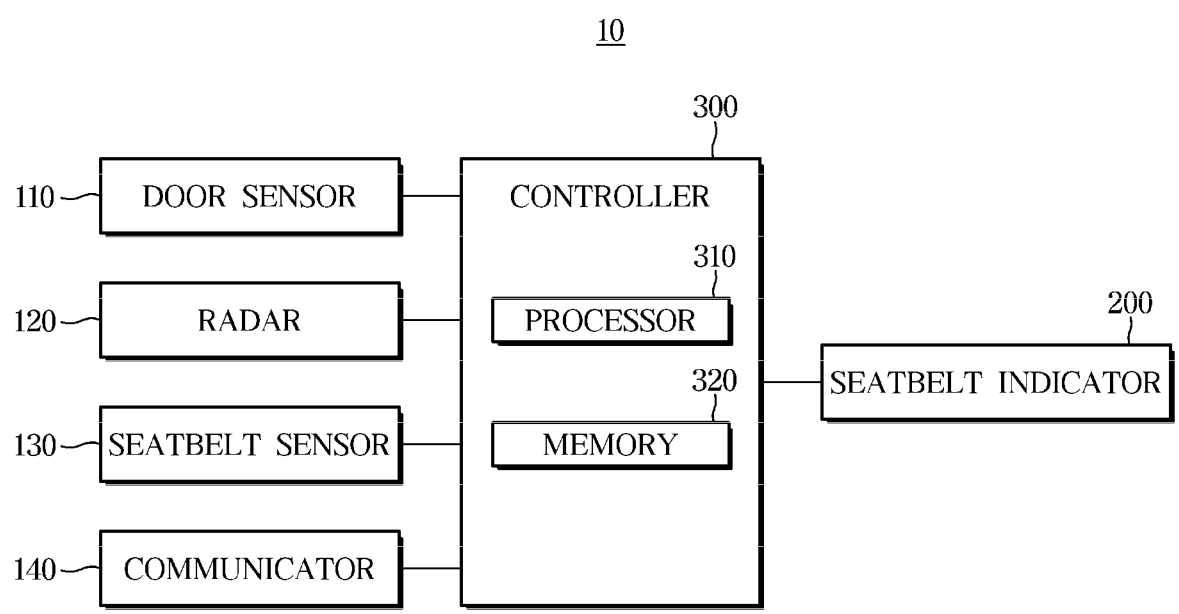
FIG. 2 is a control block diagram illustrating a vehicle in one form of the present disclosure.

FIG. 1 is a view illustrating an interior of a vehicle 10 in some forms of the present disclosure. FIG. 2 is a control block diagram illustrating a vehicle in some forms of the present disclosure.

The vehicle 10 includes an engine, a transmission, a braking device, and a steering device. The engine may include a cylinder and a piston and may generate power for the vehicle 10 to travel. The transmission may include a plurality of gears and may transmit power generated by the engine to the wheels. The braking device may decelerate the vehicle 10 or stop the vehicle 10 through friction with the wheels. The steering device may change the travelling direction of the vehicle 10.

The vehicle 10 may include a plurality of electrical components. For example, the vehicle 10 may include an engine management system (EMS), a transmission controller (TCU), an electronic brake control module, an electronic power steering (EPS), a body control module (BCM), and a driver assistance system (DAS).

In particular, the BCM may control the operation of electronic components that provide convenience to the driver or ensure the safety of the driver. For example, the BCM may control head lamps, wipers, clusters, multifunction switches, turn signal lamps, seat belts, and the like.

Electronic components of the vehicle 10 may communicate with each other via a vehicle communication network (NT). For example, electronic components may transmit data through Ethernet, most oriented systems transport (MOST), Flexray, controller area network (CAN), local interconnect network (LIN), and the like.

Referring to FIGS. 1 and 2, a driver's seat 11, a passenger seat 12, and a rear seat 13 may be provided inside the vehicle 10. Each of the driver's seat 11, the passenger seat 12, and the rear seat 13 is provided with a seat belt. That is, the seat belt may be provided for each seat of the vehicle 10. The seat belt may be referred to as a safety belt. Since the seat belt is a basic configuration provided in the vehicle 10, detailed description thereof will be omitted.

The vehicle 10 is provided at an inside thereof with a dashboard, a cluster 210, a steering wheel, a plurality of buttons related to various functions of the vehicle 10, an audio, video, navigation (AVN) device 220, a speaker 230, and the like. The cluster 210 may include various indicating lights. The cluster 210 may be implemented in a digital type cluster. The AVN device 220 includes a display. The AVN device 220 and the speaker 230 may be provided at various locations in the vehicle 10.

In addition, a radar 120 may be provided inside the vehicle 10 to acquire radar data regarding an object inside the vehicle 10. In FIG. 2, the radar 120 is illustrated as being installed on the ceiling of the vehicle 10, but may be installed at various locations. In addition, a plurality of the radars may be provided.

The radar 120 includes a transmit antenna (or a transmit antenna array) that emits transmission radio waves and a receive antenna (or a receive antenna array) that receives reflected radio waves reflected from an object. The radar 120 may acquire radar data regarding an object inside the vehicle from the transmission radio waves transmitted by the transmit antenna and the reflected radio waves received by the receive antenna. The radar 120 may be connected to a controller 300 through the vehicle communication network NT, a hard wire, or a printed circuit board (PCB). The radar 120 may transmit radar data to the controller 300.

Although not shown, an imaging sensor (not shown) may be provided inside the vehicle 10. The imaging sensor may photograph an occupant of the vehicle 10 to acquire an image of the occupant, and generate image data. The imaging sensor may be a camera. The imaging sensor may photograph a face and a gesture of a passenger who rides the vehicle 10. The imaging sensor may be electrically connected to the controller 300, and may transmit the image data to the controller 300.

Various sensors may be provided in the vehicle 10. The sensors may be installed at various locations in the vehicle 10. For example, the vehicle 10 may include a door sensor 110 provided at a door, a seatbelt sensor 130 provided at a seat belt, and a seating sensor (not shown) provided at respective seats 11, 12, and 13. The sensors are not limited thereto, and various sensors may be further provided. The sensors may be electrically connected to the controller 300 and transmit sensing data to the controller 300.

The door sensor 110 may detect opening and closing of the door. The seatbelt sensor 130 may be provided on each seat belt of the seats, and may detect a state of the seat belt. The seatbelt sensor 130 may detect an unfastened state or a fastened state of the seat belt.

The vehicle 10 may include a seatbelt indicator 200. The seatbelt indicator 200 may provide a notification regarding the fastening of the seat belt. The seatbelt indicator 200 may provide a notification regarding the fastening of each seat belt provided on each seat. The seatbelt indicator 200 may include at least one of an indicator light provided in the cluster 210, a graphic user interface output through the AVN device 220, and a warning sound output through the speaker 230. In addition, the seatbelt indicator 200 may include a guide message regarding the wearing of a seat belt output through at least one of the AVN device 220 or the speaker 230. The seatbelt indicator 200 may also be referred to as a seatbelt reminder.

The vehicle 10 may further include a communicator 140. The communicator 140 may transmit and receive data by communicating with an external device. In detail, the communicator 140 may transmit notification information regarding the fastening of the seat belt to an external device. For example, the controller 300 may control the communicator 140 to transmit notification information regarding the fastening of the seat belt to a smart phone of a driver, which is an external device.

The communicator 140 may communicate with an external device using various methods. The communicator 140 may transmit and receive data to and from an external device using communication technologies, such as vehicle-to-vehicle (V2V) communication, Wi-Fi, wireless local area network (WLAN), ultra-mobile broadband (UMB), long term evolution (LTE), and the like. The present disclosure is not limited thereto, and any method may be applied as long as it may communicate with an external device.

The controller 300 includes a memory 320 for memorizing/storing programs, instructions, and data for controlling the operation of the vehicle 10, and a processor for generating a control signal for controlling the operation of the vehicle 10 on the basis of the programs, instructions, and data memorized/stored in the memory 320. The processor 310 may include a digital processor for processing at least one of radar data, image data, or sensing data, and a micro control unit (MCU) for generating a control signal. The processor 310 and the memory 320 may be implemented as separate chips or as a single chip. In addition, the controller 300 may include a plurality of the processors 310 and a plurality of the memories 320.

The processor 310 may include a logic circuit and an arithmetic circuit, may process data according to programs and/or instructions provided from the memory 320, and generate a control signal according to a processing result. The processor 310 may be electrically connected to various devices included in the vehicle 10. In addition, the processor 310 is electrically connected to the memory 320. The memory 320 may include a non-volatile memory, such as a flash memory, a read only memory (ROM), an erasable programmable read only memory (EPROM), or the like, as well as a volatile memory, such as an S-RAM or a D-RAM.

Hereinafter, the operation of the controller 300 for controlling the operation of the seatbelt indicator will be described in detail.

The controller 300 may perform a first check regarding the state of the seat belt. The first check regarding the state of the seat belt is performed before the vehicle 10 is occupied by an object. That is, the controller 300 may determine whether the seat belt is in an unfastened state or a fastened state before the vehicle 10 is occupied by an object.

The controller 300 may process radar data. The controller 300 may check the occupancy and the occupied position of the object on the basis of the radar data acquired by the radar 120. In addition, the controller 300 may identify the type of the object in the vehicle on the basis of the radar data. For example, the controller 300 may identify whether the object occupying the vehicle 10 is a human or an object other than a human.

On the other hand, the controller 300 may operate the radar 120 if the opening and closing of the door is detected by the door sensor 110. However, the radar 120 may also operate independent of the opening and closing of the door.

The controller 300 may determine the operating state of the seatbelt indicator 200 on the basis of the type of the object and the occupied position of the object. The controller 300 may determine the operating state of the seatbelt indicator 200 related to a seat belt provided in a seat corresponding to the occupied position of the object. In detail, if the type of the object is not a human, the controller 300 may determine the operating state of the seatbelt indicator 200 to have an off-state. Since the seat belt does not need to be fastened if the object is not a human, turning off the seatbelt indicator 200 may be desired in terms of user convenience.

The controller 300 may turn on the seatbelt indicator after performing the first check regarding the state of the seat belt. For example, the controller 300 may turn on the seatbelt indicator if it is determined as a result of the first check that the seat belt is in an unfastened state. In addition, the controller 300 may turn on the seatbelt indicator even if it is determined as a result of the first check that the seat belt is in a fastened state. The controller 300 may turn off if the seat belt is in a fastened state. However, the controller 300 may turn on the seatbelt indicator even if the seat belt is already fastened before a passenger rides the vehicle, to provide a notification regarding wearing of the seat belt.

In addition, the controller 300 may turn on the seatbelt indicator if occupancy of the object is confirmed after the first check.

The controller 300 may perform a second check regarding the state of the seat belt if the type of the object is a human, and determine the operating state of the seatbelt indicator 200 to have an on-state or an off state according to the result of the second check.

If the seatbelt indicator 200 is in an on-state after the first check regarding the state of the seat belt is performed, the controller 300 may allow the operating state of the seatbelt indicator 200 to be kept in an on-state or to be switched into an off-state according to the result of the second check.

If it is determined as the first check that the state of the seat belt is in an unfastened state, and it is determined as a result of the second check that the state of the seat belt is in a fastened state, the controller 300 may determine the operating state of the seatbelt indicator 200 to have an off-state. Since it is determined that the object, which is a human being, wears the seat belt, the seatbelt indicator 200 is turned off.

If it is determined as a result of the first check that the state of the seat belt is determined to be in a fastened state, and it is determined as a result of the second check that the state of the seat belt is switched to an unfastened state and then to a fastened state, the controller 300 may determine the operating state of the seatbelt indicator 200 to have an off-state. This is because it is determined that the object, which is a human, has loosened the seat belt, which was previously fastened, and then has worn the seat belt.

If it is determined as a result of the first check that the state of the seat belt is in an unfastened state, and it is determined as a result of the second check that the state of the seat belt is in an unfastened state, the controller 300 may determine the operating state of the seatbelt indicator to have an on-state. This is because it is determined that the object, which is a human, does not wear the seat belt.

In addition, if it is determined as a result of the first check that the state of the seat belt is in a fastened state and it is determined as a result of the second check that the state of the seat belt is not switched, the controller 300 may determine the operating state of the seatbelt indicator to have an on-state. This is because it is determined that the object, which is a human, has not unfastened and worn the seat belt.

As such, the vehicle 10 in some forms of the present disclosure may inhibit undesired notifications by turning on/off an operation of the seatbelt indicator according to the type of the object, and may secure passenger safety by allowing passengers to wear the seat belt. In other words, by checking the state of the seat belt twice (the first check and the second check), undesired notification of the seatbelt indicator may be prevented. In particular, undesired operations of the seatbelt indicator related to an object occupied in the rear seat may be eliminated.

Figure 3:
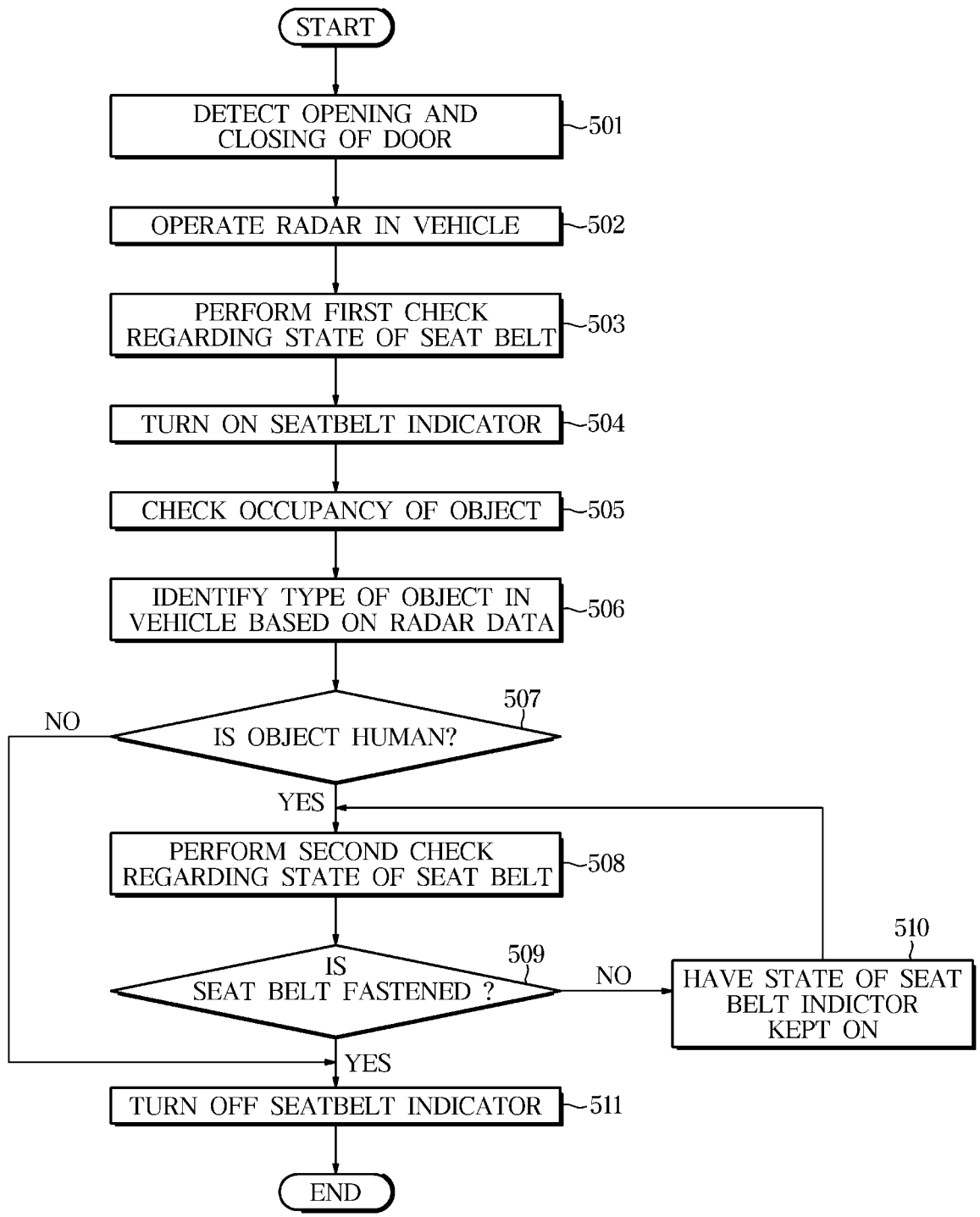
FIG. 3 is a flowchart showing a method of controlling a vehicle in one form of the present disclosure.

FIG. 3 is a flowchart showing a method of controlling a vehicle in some forms of the present disclosure.

Referring to FIG. 3, the door sensor 110 may detect opening and closing of the door (501). The controller 300 may operate the radar 120 provided inside the vehicle (502). The controller 300 performs the first check regarding the state of the seat belt (503). That is, the controller 300 may determine whether the seat belt is in an unfastened state or a fastened state before the vehicle 10 is occupied by an object. The controller 300 may turn on the seatbelt indicator after performing the first check regarding the state of the seat belt (504). The controller 300 may turn off the seatbelt indicator if it is determined as a result of the first check that the seat belt is in a fastened state.

The controller 300 checks occupancy of an object on the basis of radar data obtained by the radar 120 (505). The controller 300 may turn on the seatbelt indicator if the occupancy of the object is confirmed after the first check.

The controller 300 identifies the type of the object in the vehicle on the basis of the radar data (506). The controller 300 may check the occupancy of the object and may identify the type of the object by further using image data acquired by the image sensor (not shown). For example, the controller 300 may identify whether the object in the vehicle 10 is a human or an object other than a human.

If the type of the object is not a human, the controller 300 determines the operating state of the seatbelt indicator 200 to have an off-state (507 and 511).

If the type of the object is a human, the controller 300 performs the second check regarding the state of the seat belt (508). If it is determined as a result of the second check that the state of the seat belt is in an unfastened state, the controller 300 determines the operating state of the seatbelt indicator to have an on-state (509 and 510). If it is determined as a result of the second check that the state of the seat belt is in a fastened state, the controller 300 determines the operating state of the seatbelt indicator 200 to have an off-state (511).

Figure 4:
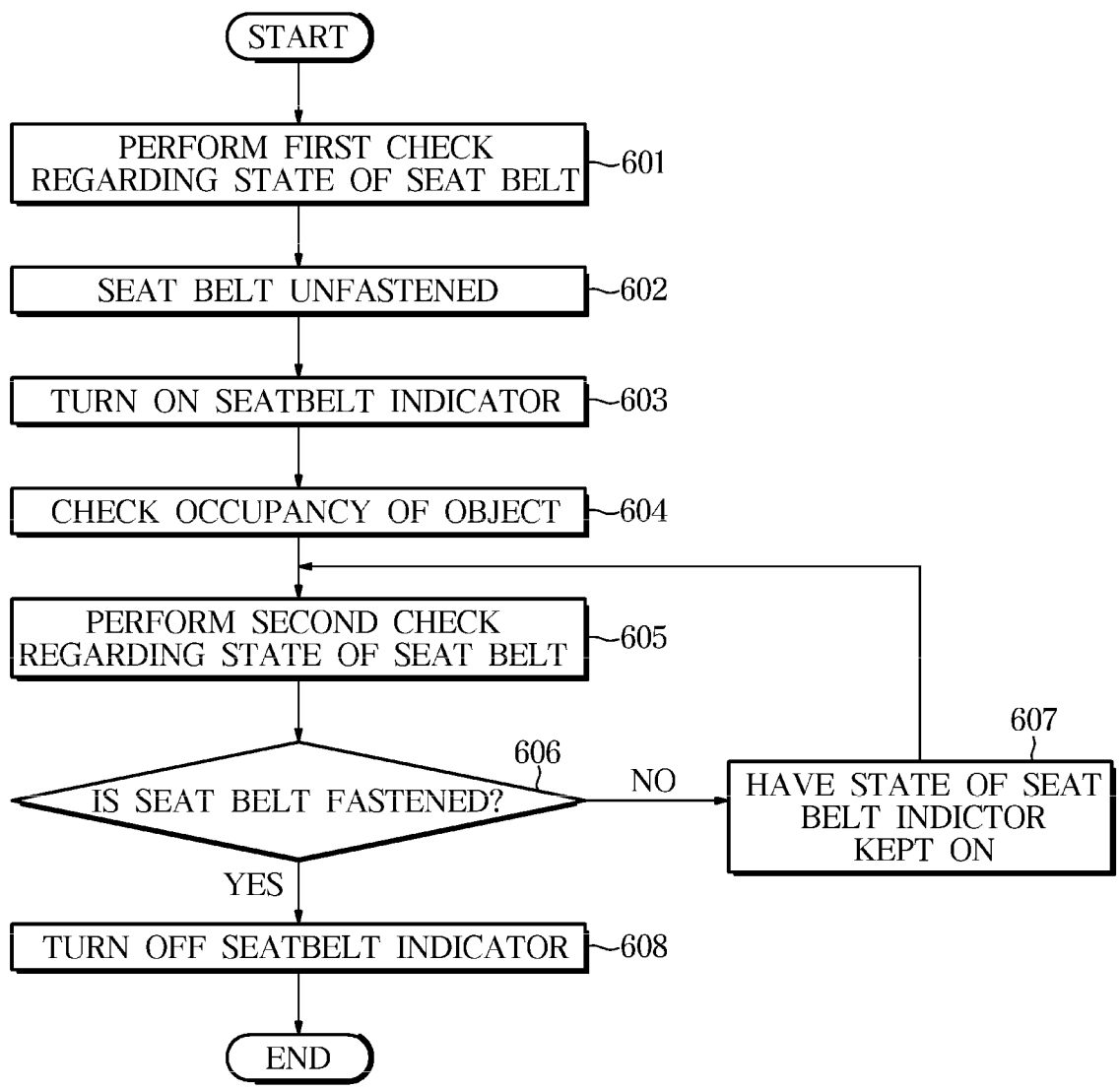
FIGS. 4 and 5 are detailed flowcharts showing a method of controlling a vehicle in one form of the present disclosure.
Figure 5:
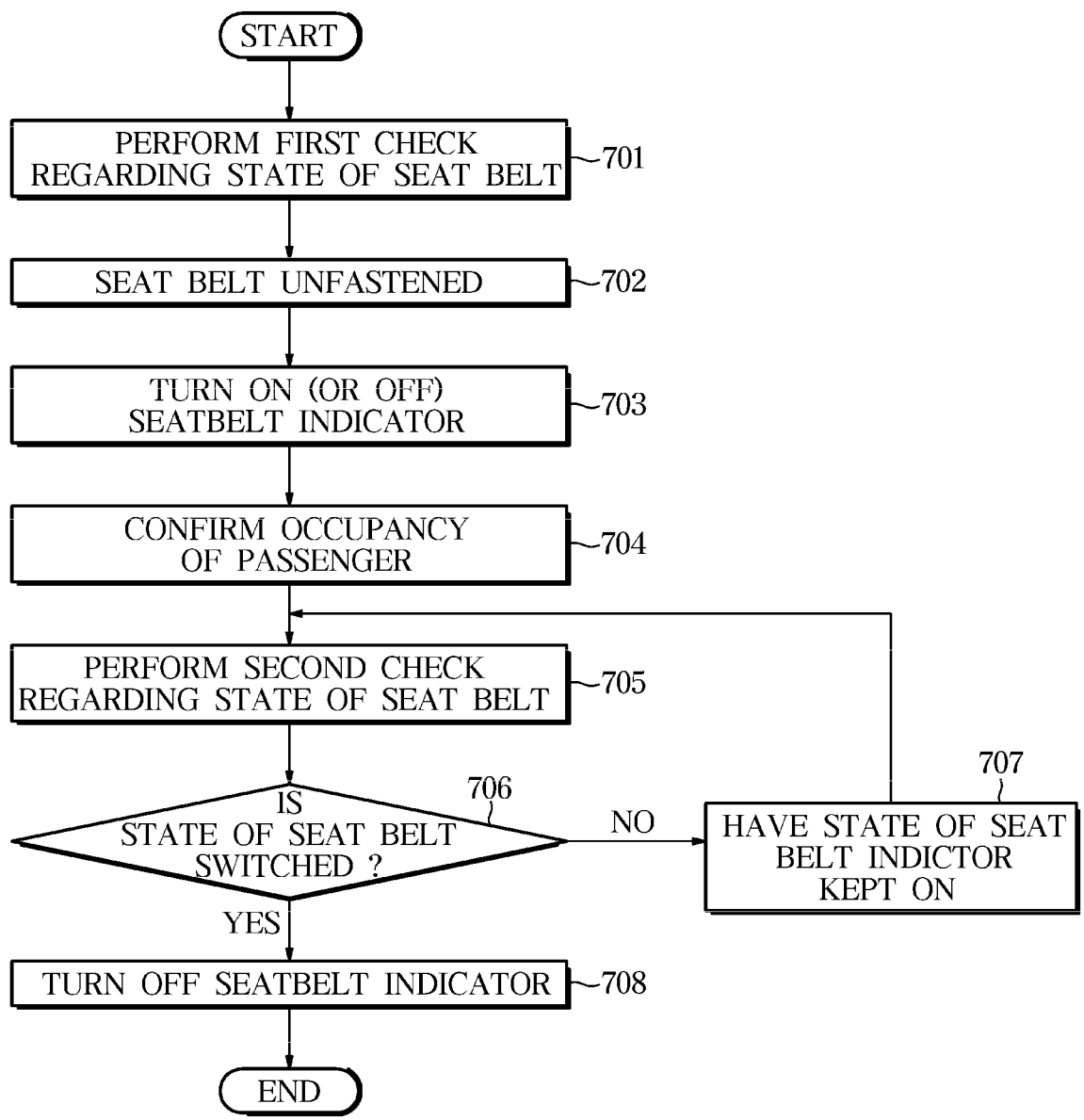

FIGS. 4 and 5 are detailed flowcharts showing a method of controlling a vehicle in some forms of the present disclosure.

Referring to FIG. 4, the controller 300 performs the first check regarding the state of the seat belt (601). If it is determined as a result of the first check that the state of the seat belt is in an unfastened state (602), the controller 300 turns on the seatbelt indicator (603). The controller 300 checks occupancy of a passenger (a human) (604), and performs the second check regarding the state of the seat belt (605). If it is determined as a result of the second check that the state of the seat belt is in an unfastened state (606), the controller 300 determines such that the operating state of the seatbelt indicator is kept in the on-state (607). This is because it is determined that the passenger does not wear a seat belt.

On the contrary, if it is determined as a result of the second check that the state of the seat belt is in a fastened state (606), the controller 300 turns off the seatbelt indicator 200 (608). Since it is determined that the passenger wears the seat belt, the seatbelt indicator 200 is turned off.

Referring to FIG. 5, the controller 300 performs the first check regarding the state of the seat belt (701). If it is determined as a result of the first check that the state of the seat belt is in a fastened state (702), the controller 300 turns on the seatbelt indicator (703). In this case, the controller 300 may turn off the seatbelt indicator. The controller 300 checks the occupancy of the passenger (a human) (704) and performs the second check regarding the state of the seat belt (705).

If it is determined as a result of the second check that the state of the seat belt is not switched, the controller 300 determines the operating state of the seatbelt indicator to have an on-state (706 and 708). This is because it is determined that the passenger has not loosened the seat belt, which was previously fastened, and not worn the seat belt.

On the contrary, if it determined as a result of the second check that the state of the seat belt is switched to the unfastened state and then to the fastened state, the controller 300 determines the operating state of the seatbelt indicator 200 to have an off-state (706 and 707). This is because it is determined that the passenger has loosened the seat belt, which was previously fastened, and has worn the seat belt.

As described above, the vehicle in some forms of the present disclosure and the method of controlling the same includes the radar provided in the vehicle, identify the type of the object in the vehicle using the radar, and determine the operating state of the seatbelt indicator according to the type of the object.

In addition, the vehicle in some forms of the present disclosure and the method of controlling the same may eliminate an undesired notification by turning on/off the operation of the seatbelt indicator according to the type of object, and ensure the safety of the passenger by allowing the passenger to wear the seat belt.

Meanwhile, some forms of the present disclosure may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the vehicle and the method of controlling the same in some forms of the present disclosure can identify the type of an object occupying the vehicle by using a radar provided in the vehicle and determine the operating state of a seat belt indicator according to the type of the object.

The vehicle and the method of controlling the same in some forms of the present disclosure can inhibit an undesired inappropriate notification by turning on/off the operation of the seatbelt indicator according to the type of the object, and improve the safety of the passenger by allowing the passengers to wear the seatbelt.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A vehicle comprising:
    a door sensor configured to detect opening and closing of a door;
    a radar provided in the vehicle and configured to acquire radar data regarding an object in the vehicle;
    a seatbelt sensor configured to detect a state of a seat belt provided on each seat of the vehicle;
    a seatbelt indicator configured to provide a notification regarding fastening of the seat belt; and
    a controller configured to:
        control the radar in response to the opening and the closing of the door;
        perform a first check of confirming whether the seatbelt is fastened before the vehicle is occupied by the object;
        check an occupancy and an occupied position of the object based on the radar data;
        identify a type of the object in the vehicle based on the radar data;
        determine an operating state of the seatbelt indicator based on the type of the object and the occupied position of the object; and
        turn off the seatbelt indicator when the type of the object is not a human.

2. The vehicle of claim 1, wherein the controller is further configured to:
    perform a second check regarding the state of the seatbelt when the type of the object is a human; and
    turn on the seatbelt indicator or turn off the seatbelt indicator based on a result of the second check.

3. The vehicle of claim 2, wherein the controller is configured to:
    turn on the seatbelt indicator after the first check; and
    maintain the seatbelt indicator turned on or turn off the seatbelt indicator based on the result of the second check.

4. The vehicle of claim 2, wherein the controller is configured to:
    turn off the seat belt indicator when the state of the seat belt is determined to be in an unfasten state by the first check and the state of the seat belt is determined to be in a fastened state by the second check.

5. The vehicle of claim 2, wherein the controller is configured to:
    turn on the seatbelt indicator when the state of the seat belt is determined to be in an unfasten state by the first check and the state of the seat belt is determined to be in an unfastened state by the second check.

6. The vehicle of claim 2, wherein the controller is configured to:
    turn on the seat belt indicator when the state of the seat belt is determined to be in a fasten state by the first check and the state of the seat belt is determined to be switched to an unfastened state and then to a fastened state during the second check.

7. The vehicle of claim 2, wherein the controller is configured to:
    turn on the seat belt indicator when the state of the seat belt is determined to be in a fasten state by the first check and the state of the seat belt is determined to be unchanged during the second check.

8. The vehicle of claim 1, wherein the seatbelt indicator comprises at least one of an indicator light provided in a cluster, a graphic user interface output through an audio, video, navigation (AVN) device, or a warning sound output through a speaker.

9. A method of controlling a vehicle comprising:
 detecting, by a door sensor, opening and closing of a door;
 when the opening and closing of the door is detected, acquiring, by a radar provided in the vehicle, radar data regarding an object in the vehicle;
 performing, by a controller, a first check of confirming whether a seatbelt is fastened before the vehicle is occupied by the object;
 checking, by the controller, an occupancy and an occupied position of the object based on the radar data;
 identifying, by the controller, a type of the object in the vehicle based on the radar data;
 determining, by the controller, an operating state of the seatbelt indicator based on the type of the object and the occupied position of the object; and
 turning off the seatbelt indicator when the type of the object is not a human.

10. The method of claim 9, wherein determining the operating state of the seatbelt indicator further comprises:
 when the type of the object is a human, performing a second check regarding the state of the seatbelt; and
 turning on the seatbelt indicator or turning off the seatbelt indicator based on a result of the second check.

11. The method of claim 10, wherein the method further comprises:
 turning on the seatbelt indicator after the first check;
 maintaining the seatbelt indicator turned on or turn off the seatbelt indicator based on the result of the second check.

12. The method of claim 10, wherein determining the operating state of the seatbelt indicator further comprises:
 turning off the seat belt indicator based on the state of the seat belt is determined to be in an unfasten state by the first check and the state of the seat belt is determined to be in a fastened state by the second check.

13. The method of claim 10, wherein determining the operating state of the seatbelt indicator further comprises:
 turning on the seat belt indicator based on the state of the seat belt is determined to be in an unfasten state by the first check and the state of the seat belt is determined to be in an unfastened state by the second check.

14. The method of claim 10, wherein determining the operating state of the seatbelt indicator further comprises:
 turning off the seat belt indicator based on the state of the seat belt is determined to be in a fasten state by the first check and the state of the seat belt is determined to be switched to an unfastened state and then to a fastened state during the second check.

15. The method of claim 10, wherein determining the operating state of the seatbelt indicator further comprises:
 turning off the seat belt indicator based on the state of the seat belt is determined to be in a fasten state by the first check and the state of the seat belt is determined to be unchanged during the second check.

16. The method of claim 9, wherein the seatbelt indicator comprises at least one of an indicator light provided in a cluster, a graphic user interface output through an audio, video, navigation (AVN) device, or a warning sound output through a speaker.

* * * * *